United States Patent Office 3,275,565
Patented Sept. 27, 1966

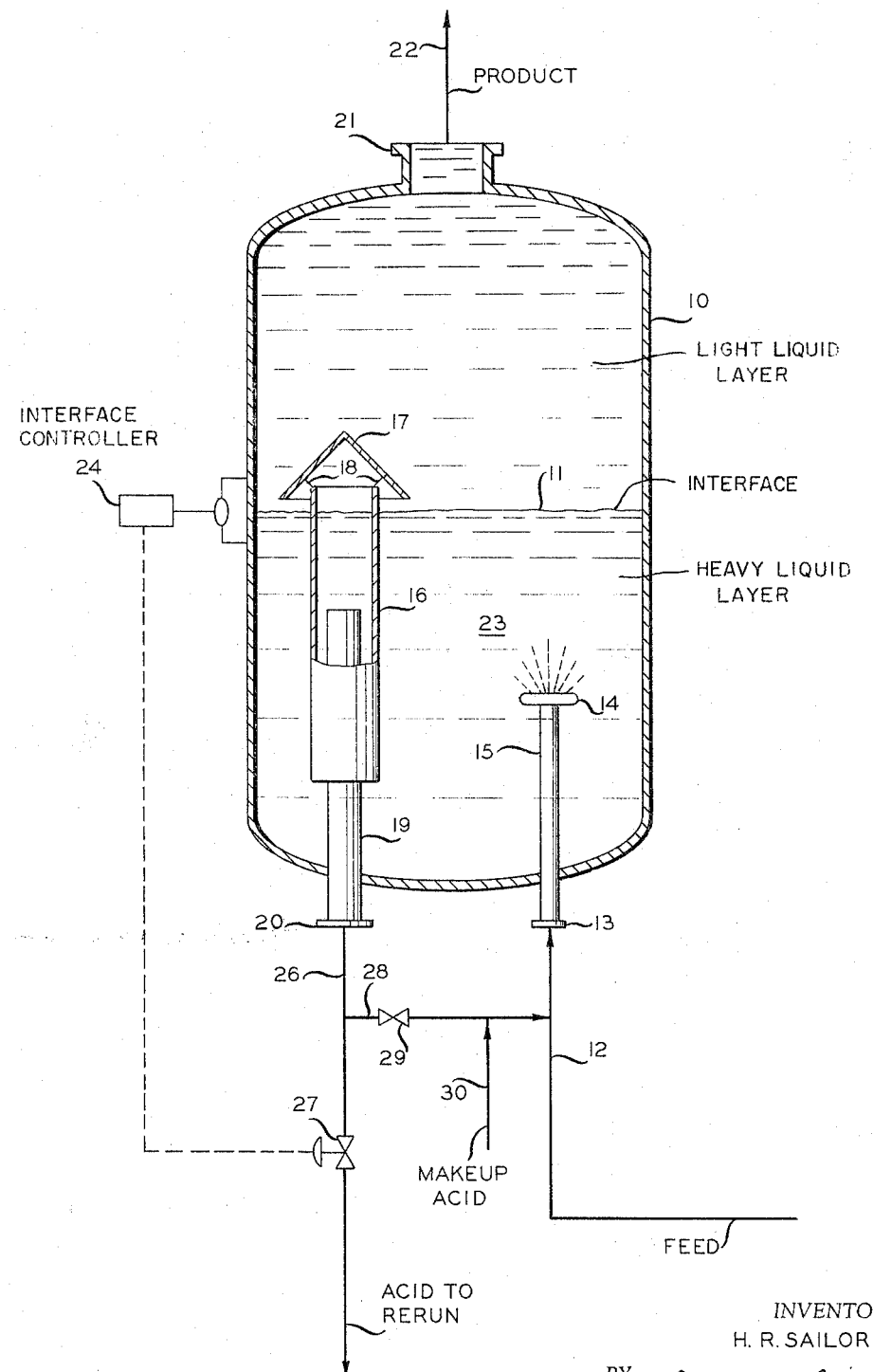

3,275,565
IMMISCIBLE LIQUID CONTACTING AND
SEPARATION APPARATUS
Howard R. Sailors, Bartlesville, Okla., assignor to Phillips
Petroleum Company, a corporation of Delaware
Filed May 23, 1963, Ser. No. 282,644
1 Claim. (Cl. 252—360)

This invention relates to a method and apparatus for contacting and separating fluids.

The effective contacting of a fluid with a second fluid and the subsequent efficient separation of immiscible fluid phases is a requirement in many processes. Effective contacting and separation of fluids is particularly difficult to accomplish when an emulsion is formed between the immiscible fluid phases such as occurs in a hydrogen fluoride alkylation process.

Accordingly, an object of my invention is to provide a method and apparatus for contacting fluids and separating substantially immiscible fluid phases.

Another object of my invention is to provide a method and apparatus for continuously contacting fluids and separating immiscible fluid phases, said contacting and separating steps effected in a single vessel.

Another object of my invention is to provide a method and apparatus for contacting fluids and separating immiscible fluid phases wherein said immiscible fluid phases form an emulsion.

Other objects, advantages and features of my invention will be readily apparent to those skilled in the art from the following description, drawing and appended claims.

The drawing is an elevation view in cross section of one embodiment of the inventive apparatus.

Referring to the drawing, there is illustrated a vertical vessel 10 having an inlet 13 and outlets 20 and 21. In communication with inlet means 13 is a conduit 15, thereby conducting a fluid directed to inlet means 13 upwardly into the lower region of vessel 10 before discharging the said fluid into vessel 10. Attached to conduit 15 is a means 14 for dispersing the incoming fluid throughout at least a substantial portion of the cross section of vessel 10. Inlet 13 is in direct communication with inlet conduit means 12.

A conduit 16, preferably cylindrical-shaped, is positioned within vessel 10 and supported within vessel 10 by a means not herein illustrated. Conduit 16 is in open communication with an intermediate region of vessel 10 above the interface 11 of the immiscible fluid phases within vessel 10 and a lower region of vessel 10 below the said interface 11. Conduit 16 is in communication with vessel 10 below dispersing means 14. Attached to conduit 16 and supported by conduit 16 via bases 18 is a fluid flow deflector 17. Conduit 16 and deflector 17 define a quiescent zone within vessel 10.

With dispersing means 14 positioned above the bottom opening of conduit 16, a fluid entering vessel 10 via inlet 13, conduit 15 and dispersing means 14 cannot flow directly into the zone defined by conduit 16, thereby preventing turbulent fluid flow upwardly through conduit 16. Deflector 17 is so positioned that a fluid cannot flow directly into and downward through conduit 16 through the top opening of conduit 16, thereby preventing turbulent flow downwardly through conduit 16. In order to enter conduit 16 from the top, it is necessary that the fluid flow upwardly and that the upwardly flowing fluid be deflected downwardly by deflector 17. The function of conduit 16 and deflector 17 will hereinafter be more fully described with respect to the employment of vessel 10 in a hydrogen fluoride alkylation process contacting and separating step.

Vessel outlet 20 is operably attached to and in communication with conduit 19 with the open end of conduit 19 in communication with an intermediate region of the quiescent zone defined by conduit 16. Vessel outlet 21 is connected to and in communication with conduit means 22. Vessel outlet 20 is connected to and in communication with outlet conduit means 26. The rate of fluid flow through conduit means 26 is manipulated by a conventional interface controller 24 determining the interface or liquid level 11 within vessel 10 and opening or closing a conventional valve means 27 responsive to said liquid or interface level measurement and the set point of liquid level controller 24.

Although not herein illustrated, it is within the scope of this invention to provide additional conduit inlet means positioned so as to discharge a fluid into the lower region of vessel 10 above the bottom opening of conduit 16.

Conduit means 28 communicates between conduit means 26 and conduit means 12, thereby providing a means of recycling, if desirable, at least a portion of a liquid withdrawn from vessel 10 via conduit means 26 to vessel 10 via conduit means 12, conduit means 15 and dispersing means 14. The rate of fluid flow through conduit means 28 is manipulated by conventional valve means 29.

Although not to be limited thereto, the invention will hereinafter be described as applied to the hydrogen fluoride alkylation process step of removing organic fluorides from hydrocarbons containing the same. In the treatment of hydrocarbons with a fluorine-containing catalyst such as hydrogen fluoride (HF), the reaction products are usually separated into fractions by distillation steps and the hydrogen fluoride is ordinarily removed overhead in the first distillation step. When the overhead product from the first distillation step is cooled, a phase separation occurs with liquid HF forming the lower phase and liquid hydrocarbons forming the upper phase. The liquid hydrocarbon phase will be saturated with HF and will also contain organic fluorides such as low-boiling alkyl fluorides. Feed to the said distillation step is saturated with HF but contains no free liquid HF since it is common practice to effect the phase separation of the effluent from the reactor and to utilize the liquid hydrocarbon phase as the feed to the distillation step.

The liquid hydrocarbon phase (such as alkylate and/or isobutane) containing the low-boiling alkyl fluorides is passed via conduit means 12, conduit means 15 and dispersing means 14 to vessel 10. Within vessel 10, the hydrocarbon feed is intimately contacted with liquid HF 23 and a substantially organic fluoride-free hydrocarbon phase is withdrawn from vessel 10 via outlet 21 and conduit means 22. The hydrocarbon feed flows upwardly from dispersing means 14 through the liquid HF. By preventing the flow of feed hydrocarbon directly into the region immediately adjacent to the open end of conduit 19, the withdrawal of liquid hydrocarbon feed from vessel 10 via conduit 19 and outlet 20 with the lower liquid HF phase is prevented.

An emulsion is formed at the interface 11 of the HF and hydrocarbon phases. Deflector 17 and conduit 16 provide a baffle means, preventing the emulsion from flowing into the top of the zone defined by conduit 16. By preventing turbulent fluid flow through the zone defined by conduit means 16, a substantially hydrocarbon-free HF containing organic fluorides dissolved therein is withdrawn from vessel 10 via conduit means 19, outlet 20 and conduit means 26.

At least a portion of the HF withdrawn from vessel 10 can be recycled via conduit means 28, valve means 29 and conduit means 12 to vessel 10 in combination with the liquid hydrocarbon feed to vessel 10. When utilizing this recycle step, premixing of the liquid hydrocarbon feed and HF is effected, increasing the efficiency of the contacting of the HF and hydrocarbon phases. Make-up HF as required can be passed to vessel 10 via conduit means 30, conduit means 28, conduit means 12 and vessel inlet 13.

It is also within the scope of this invention to employ the inventive apparatus in the contacting and separation of fluids wherein one of the immiscible fluid phases formed is a vapor and the other of the said immiscible fluid phases is a liquid. By referring again to the drawing, it can readily be seen that the contacting and separation steps involving a vapor and a liquid can be conducted in much the same manner as was discussed in connection with the contacting of two liquids and the separation of two immiscible liquid phases.

In this operation, foaming is a problem. The liquid and vapor phases can be passed in combination or independently into vessel 10. The vapor phase is introduced into the lower region of vessel 10 above the bottom opening of conduit 16. An immiscible vapor phase substantially liquid-free can be withdrawn from vessel 10 via outlet 21 and conduit means 22. A substantially vapor-free immiscible liquid phase can be withdrawn from vessel 10 via conduit 19, outlet 20 and conduit means 26. The rate of fluid flow through conduit means 26 can be manipulated responsive to the liquid level 11 of vessel 10 as determined by a controller 24 which measures the liquid level in vessel 10, such controller 24 opening and closing valve means 27 responsive thereto. As in the case of the immiscible liquid phases, the interface between the two immiscible (vapor-liquid) phases is maintained below the top of conduit 16.

The invention is thus broadly applicable to the contacting of two fluid phases and the separation of two product immiscible fluid phases Various modifications of this invention can be made in view of the foregoing disclosure and the appended claim without departing from the spirit or scope thereof.

I claim:

Liquid contacting and separation apparatus for mixing and separating two immiscible liquids comprising:

a vessel adapted to be filled with said immiscible liquids;

liquid interface control means positioned to sense an interface at a preselected level in said vessel, said level being located in the central region of said vessel;

first conduit means positioned within said vessel and extending vertically from a region below said preselected level to a region above said preselected level, the lower end of said first conduit means being in open communication with the lower region of said vessel and the upper end being in open communication with the region above said level;

deflector means positioned above and in spaced relationship with the upper open end of said first conduit means, said deflector means covering the opening of said first conduit means so as to prevent liquid from flowing directly downwardly into said upper open end of said first conduit means from the upper region of said vessel;

second conduit means extending from a region exterior of said vessel into said vessel and terminating in a liquid dispersing means at a region intermediate the lower and upper ends of said first conduit means to permit introduction of liquid into said vessel;

third conduit means positioned inside and extending from the interior and lower open end of said first conduit means and communicating at its upper end with a region intermediate the lower and upper ends of said first conduit means, said third conduit means extending outwardly and to a region exterior of said vessel to remove liquid from said vessel;

fourth conduit means communicating with the top of said vessel above said preselected level to remove liquid from said vessel;

a valve in said third conduit means; and means responsive to said liquid interface level control means to adjust said valve so as to maintain the liquid interface within said vessel at said preselected level.

References Cited by the Examiner

UNITED STATES PATENTS

| | | | |
|---|---|---|---|
| 833,150 | 10/1905 | Attenhofer | 137—590.5 |
| 1,684,489 | 9/1928 | Halloran | 23—270.5 X |
| 2,214,368 | 9/1940 | Greensfelder et al. | 202—69 X |
| 2,451,568 | 10/1948 | Linn | 260—676 |
| 2,474,032 | 6/1949 | Byrns | 208—262 |
| 2,481,300 | 9/1949 | Engle | 208—262 |
| 2,623,813 | 12/1952 | Strong | 196—14.52 X |
| 2,630,376 | 3/1953 | Dunn | 23—267 |
| 2,689,874 | 9/1954 | Findlay | 196—14.52 X |
| 2,710,250 | 6/1955 | Andrews et al. | 23—267 |
| 2,729,549 | 1/1956 | Reman et al. | 23—310 |
| 2,776,329 | 1/1957 | Mayeux | 196—14.52 X |

NORMAN YUDKOFF, *Primary Examiner*.

ALPHONSO D. SULLIVAN, *Examiner*.

F. E. DRUMMOND, *Assistant Examiner*.